United States Patent
Maung et al.

(10) Patent No.: US 10,014,957 B2
(45) Date of Patent: Jul. 3, 2018

(54) HIGH SPEED ISOLATED AND OPTICAL USB

(71) Applicant: Texas Instruments Incorporated, Dallas, TX (US)

(72) Inventors: Win N. Maung, Plano, TX (US); Suzanne M. Vining, Plano, TX (US)

(73) Assignee: TEXAS INSTRUMENTS INCORPORATION, Dallas, TX (US)

( * ) Notice: Subject to any disclaimer, the term of this patent is extended or adjusted under 35 U.S.C. 154(b) by 175 days.

(21) Appl. No.: 15/067,410

(22) Filed: Mar. 11, 2016

(65) Prior Publication Data

US 2016/0269126 A1    Sep. 15, 2016

Related U.S. Application Data

(60) Provisional application No. 62/132,907, filed on Mar. 13, 2015, provisional application No. 62/274,005, filed on Dec. 31, 2015.

(51) Int. Cl.
*H04B 10/80* (2013.01)
*H04B 10/29* (2013.01)
(Continued)

(52) U.S. Cl.
CPC ....... *H04B 10/802* (2013.01); *G06F 13/4068* (2013.01); *H04B 10/25* (2013.01);
(Continued)

(58) Field of Classification Search
CPC .. H04B 10/802; H04B 10/29; H04L 12/40039
See application file for complete search history.

(56) References Cited

U.S. PATENT DOCUMENTS 7,346,728 B1    3/2008    Jackson
8,521,930 B1    8/2013    Meyers
(Continued)

OTHER PUBLICATIONS

Analog Devices ADuM4160 Full/Low Speed 5 kV USB Digital Isolator Datasheet, 2009-2012, 16 Pages, Analog Devices, Inc., Norwood, MA, U.S.A.

(Continued)

*Primary Examiner* — Freshteh N Aghdam
(74) *Attorney, Agent, or Firm* — John R. Pessetto; Charles A. Brill; Frank D. Cimino

(57) ABSTRACT

A system and method are disclosed for providing electrically isolated communications between two USB2 devices. Two isolating eUSB2 repeaters are utilized to implement a digital isolation barrier between the two USB2 devices. The isolating eUSB2 repeaters are configured to broker isolated communications between the two USB2 devices using a modified eUSB2 protocol that allows the two isolating eUSB2 repeaters to interoperate across the isolating barrier. The modified eUSB2 protocol allows the two isolating eUSB2 repeaters to broker isolating communications on behalf of the USB2 devices without the use of an accurate clock signal. The modified eUSB2 protocol utilized by the isolating eUSB2 repeaters is configured in particular to support certain end-of-packet translations between USB2 data and the modified eUSB2 protocol, management of certain USB2 bus state transitions and assignment of roles to the two isolating eUSB2 repeaters.

7 Claims, 2 Drawing Sheets

(51) Int. Cl.
*H04L 12/40* (2006.01)
*G06F 13/40* (2006.01)
*H04B 10/25* (2013.01)

(52) U.S. Cl.
CPC ....... *H04B 10/29* (2013.01); *H04L 12/40032* (2013.01); *H04L 12/40039* (2013.01)

(56) References Cited

U.S. PATENT DOCUMENTS

| | | | |
|---|---|---|---|
| 9,727,514 B2* | 8/2017 | Ma | G06F 1/3287 |
| 2006/0265540 A1 | 11/2006 | Mass et al. | |
| 2007/0296509 A1 | 12/2007 | Yang et al. | |
| 2009/0031056 A1 | 1/2009 | Bliss et al. | |
| 2012/0206164 A1 | 8/2012 | Gaalaas et al. | |
| 2014/0003306 A1 | 1/2014 | Chen et al. | |
| 2014/0006674 A1* | 1/2014 | Chan | G06F 13/4027 710/313 |
| 2014/0149609 A1* | 5/2014 | Chan | G06F 13/385 710/16 |
| 2014/0211862 A1 | 7/2014 | Moghe et al. | |
| 2014/0270253 A1* | 9/2014 | Yuenyongsgool | G06F 1/04 381/98 |
| 2015/0227489 A1* | 8/2015 | Chen | G06F 13/4291 710/313 |

OTHER PUBLICATIONS

Supplementary European Search Report in corresponding European Patent Application No. EP16765549, dated Nov. 20, 2017 (3 pages).
International Search Report and Written Opinion of the International Searching Authority, PCT/US 2016/022314, dated Jul. 14, 2016 (8 pages).

* cited by examiner

HIGH SPEED ISOLATED AND OPTICAL USB

CROSS-REFERENCE TO RELATED APPLICATIONS

This application claims the benefit of U.S. Provisional Application No. 62/274,005, filed Dec. 31, 2015, and of U.S. Provisional Application No. 62/132,907, filed Mar. 13, 2015, the disclosures of which are incorporated herein in their entirety.

TECHNICAL FIELD

The recited claims are directed, in general, to USB devices and, more specifically, to electrical isolation between USB devices.

BACKGROUND

Universal Serial Bus (USB) has become a ubiquitous mechanism for connecting systems of devices. The expansion of USB has resulted in a wide variety of USB devices with varying power requirements. Even though the maximum signaling and supply voltages that can be transmitted between USB devices is limited per the USB specification, significant ground imbalances can exist between connected USB devices. Ground imbalances between USB devices results in favorable conditions for various phenomena such as electrical surges, electrostatic discharge and ground loops to propagate between the devices via the USB connection. Such phenomena may be especially damaging in industrial environments where high voltages are present. Electrical isolation prevents electrical phenomena from being propagated between devices.

Electrical isolation of USB devices can be provided using a repeater component that translates between analog USB signals and digital signals. Such conventional repeater components may provide effective electrical isolation, but may require complex and costly implementations in order to translate between packetized digital information and analog signals. Due to this complexity, conventional electrical isolation implemented in this manner may result in limiting the bandwidth of the USB connection to full speed (12 Mbps).

SUMMARY

This disclosure describes systems, methods and devices for providing electrically isolated communications between two Universal Serial Bus 2.0 (USB2) devices. The isolated communications are provided according to various embodiments utilizing: a first digital transceiver operable to communicate with a second digital transceiver, wherein the digital transceiver communications are digital signals, and wherein the digital transceiver communications are conducted via an electrically isolating communication interface; the second digital transceiver; a first isolating embedded USB 2.0 (eUSB2) repeater coupled to the first digital transceiver and further coupled to a first USB2 device, the first isolating eUSB2 repeater operable to translate between USB2 communications with the first USB2 device and the digital signals and further operable to communicate the digital signals to the first digital transceiver; and a second isolating eUSB2 repeater coupled to the second digital transceiver and further coupled to a second USB2 device, the second isolating eUSB2 repeater operable to translate between USB2 communications with the second USB2 device and the digital signals and further operable to communicate the digital signals to the second digital transceiver.

According to various additional embodiments, the translation of the signals is based on the communication speed of the connection between the first USB2 device and the second USB2 device. According to various additional embodiments, the role of the first isolating eUSB2 repeater and the role of the second isolating eUSB2 repeater are configured based on detecting a pull-up from the first USB2 device or the second USB2 device. According to various additional embodiments, the electrically isolating communication interface comprises one of: an optical interface, a line of sight interface, a radio frequency interface, a capacitive interface or an inductive interface. According to various additional embodiments, the first eUSB2 isolating repeater and the second isolating eUSB2 repeater utilize non-crystal oscillators for timing functions. According to various additional embodiments, the first isolating eUSB2 repeater is operable to translate an USB2 end-of-packet signal received from the first USB2 device to a single digital pulse, and wherein the single digital pulse is communicated to the second isolating eUSB2 repeater via the first digital transceiver and the second digital transceiver. According to various additional embodiments, the second isolating eUSB2 repeater is operable to receive the single digital pulse and further operable to translate the single digital pulse to a USB2 end-of-packet signal that is communicated to the second USB2 device. According to various additional embodiments, the second isolating eUSB2 repeater translates the USB2 end-of-packet signal by driving an SE0 state for the duration of the single digital pulse and by driving a J state for an approximated unit interval. According to various additional embodiments, the first isolating eUSB2 repeater is operable to detect an extended high-speed idle state in the first USB2 device and further operable to derive the bus state of the first USB2 device based on the detection of J state and chirp K signals by the first USB2 device. According to various additional embodiments, the first isolating eUSB2 repeater is operable to detect sleep state in the first USB2 device based on the detection of handshake and token packets transmitted by the first USB2 device and the second USB2 device.

BRIEF DESCRIPTION OF THE DRAWINGS

Figure 1:
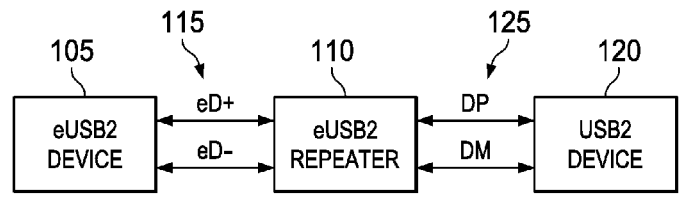

Having thus described the invention in general terms, reference will now be made to the accompanying drawings, wherein:

FIG. 1 is a block diagram illustrating certain components of a conventional eUSB2 repeater system.

Figure 2:
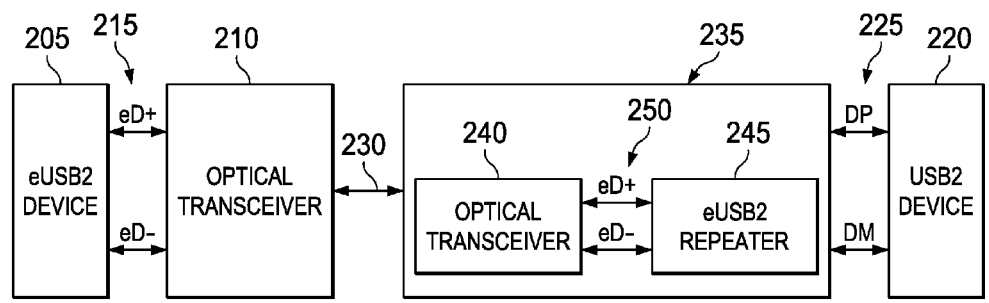

FIG. 2 is a block diagram illustrating certain components of a conventional eUSB2 to USB 2.0 isolation system.

Figure 3:
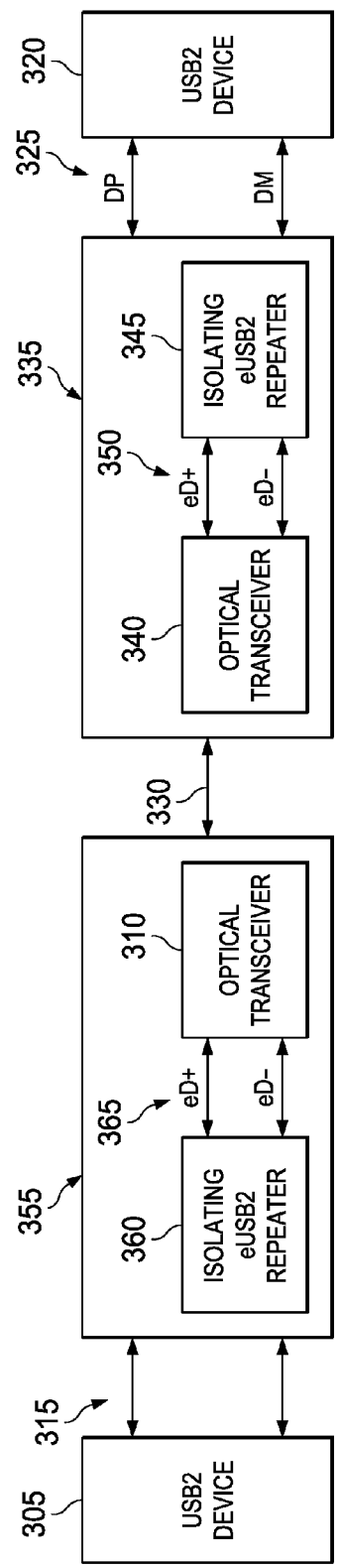

FIG. 3 is a block diagram illustrating certain components of a USB isolation system according to certain embodiments.

Figure 4:
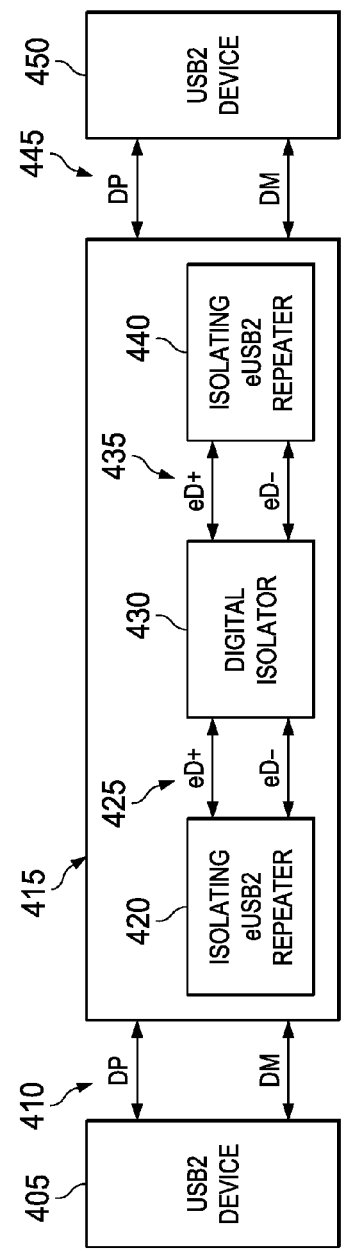

FIG. 4 is a block diagram illustrating certain components of a USB isolation system according to certain additional embodiments.

Figure 5:
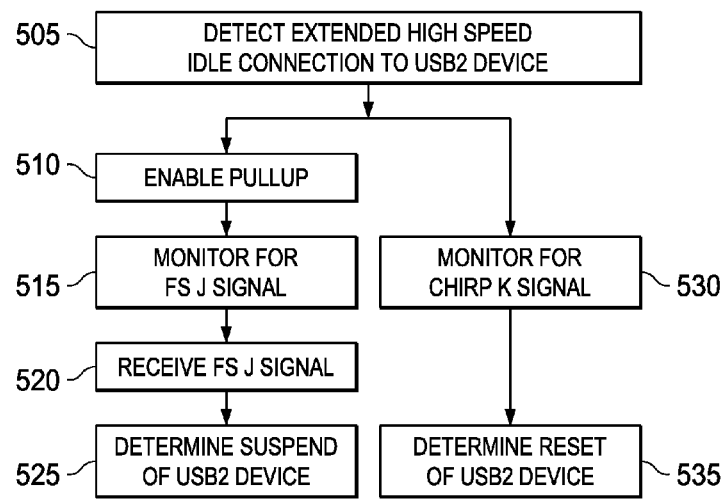

FIG. 5 is a flowchart illustrating certain steps of a process for providing high-speed USB isolation according to certain embodiments.

DETAILED DESCRIPTION

As the dimensions of certain USB devices have decreased, the power requirements for such small-scale USB devices have decreased accordingly. In order to support the continued development of such small-scale, low-power USB devices, the USB 2.0 (USB2) standard was extended to provide a specification for embedded USB 2.0 (eUSB2) devices. USB2 devices communicate using analog signaling via a pair of differential data lines. The eUSB2 specification utilizes a digital signaling protocol for communications between eUSB2 devices. eUSB2 repeaters are components that can translate between USB2 analog signaling and eUSB2 digital signaling.

FIG. 1 depicts a conventional USB system that implements a repeater between a digital eUSB2 interface and an analog USB 2.0 interface. The conventional system includes an eUSB2 device 105 that is connected to a standard USB2 device 120. The eUSB2 device 105 is configured to communicate using a pair of bi-directional, eD+/eD− digital transmission lines 115. The USB2 device 120 communicates using analog DP/DM data signal lines 125. A conventional eUSB2 repeater 110 provides bi-directional translation between the analog DP/DM data signals 125 and the eUSB2 eD+/eD− digital transmission signals 115. In addition to providing translation, the conventional eUSB2 repeater 110 is also configured to broker communications between the eUSB2 device 105 and the USB2 device 120.

A conventional eUSB2 repeater 110 has two sets of ports, one set configured for USB2 communications and the other set configured for eUSB2 communications. In the upstream direction, the conventional eUSB2 peripheral repeater 110 communicates with the USB2 device 120 via the DP/DM USB2 port via communications set forth in the USB 2.0 Specification. In the downstream direction, the conventional eUSB2 peripheral repeater 110 communicates with the eUSB2 device 105 via the eD+/eD− eUSB2 port via communications set forth in the eUSB2 Specification. In the downstream direction, the conventional eUSB2 host repeater 110 communicates with the USB2 device 120 via the DP/DM USB2 port via communications set forth in the USB 2.0 Specification. In the upstream direction, the conventional eUSB2 host repeater 110 communicates with the eUSB2 device 105 via the eD+/eD− eUSB2 port via communications set forth in the eUSB2 Specification.

In translating the communications between the USB2 device 120 and the eUSB2 device 105, the conventional eUSB2 repeater 110 relies on certain aspects of the eUSB2 communications received from the eUSB2 device. In particular, the conventional eUSB2 repeater 110 relies on timing information associated with eUSB2-compliant control messages and packet encodings provided by the eUSB2 device 105 communications. The conventional eUSB2 repeater 110 utilizes these eUSB2-compliant control messages and packet encodings as a source of timing information that it utilizes in translating certain eUSB2 inputs to USB2 outputs and in managing certain USB2 bus state transitions.

For instance, during full-speed and low-speed USB communications, an eUSB2 end-of-packet (EOP) signal is encoded by the eUSB2 device 105 using a pair of timed voltage pulses on the eUSB2 eD+/eD− data lines 115. The conventional eUSB2 repeater 110 uses the first timed pulse to trigger the driving of a single-ended zero SE0 state on the DP/DM data lines 125 by driving both data lines low. The conventional eUSB2 repeater 110 continues driving the SE0 signal until the second timed pulse is received from the eUSB2 device 105. For the duration of the second pulse, the conventional eUSB2 repeater 110 drives a J state on the DP/DM data lines 125, thus completing the translation of the eUSB2 EOP input to a USB2 EOP output. This process by the conventional eUSB2 repeater 110 is asynchronous, in that there is no clock delay between the full-speed and low-speed EOP eUSB2 inputs and the USB2 EOP outputs and no clock is utilized to differentiate the two pulses.

The translation of full-speed and low-speed EOP signals in the other direction is likewise completed asynchronously by the conventional eUSB2 repeater 110. The USB2 device 120 signals EOP by driving an SE0 state followed by a J state on the DP/DM data lines 125. For the duration of the SE0 state on the DP/DM data lines 125, the conventional eUSB2 repeater 110 generates a pulse on the eD+/eD− data lines 115, thus generating a eUSB2 EOP output.

In this manner, a conventional eUSB2 repeater 110 translates full-speed and low-speed EOP signals between USB2 device 120 and eUSB2 device 105 without retiming the data being transmitted between the two devices. In doing so, the conventional eUSB2 repeater 110 relies on timing information provided in eUSB2 full-speed and low-speed EOP inputs to derive the correct timing used to generate a sequence of outputs encoding an USB2 EOP signal.

Another aspect of brokering communications between the USB2 device 120 and the eUSB2 device 105 by the conventional eUSB2 repeater 110 that relies on timing or internal information provided by the eUSB2 device 105 is distinguishing between reset and suspend (L2) bus state transitions by the USB2 device 120 when operating at high-speed. A change to a reset or suspend bus state by the peripheral USB2 device 120 is indicated by an extended idle state on the USB2 DP/DM inputs 125. The extended idle state propagates to the eUSB2 device 105. Upon detecting an extended idle state by the USB2 device 120, the eUSB2 device 105 issues control messages that are utilized by the conventional eUSB2 repeater 110 to ascertain the current bus state of the USB2 device 120. In this manner, the conventional eUSB2 repeater 110 relies on timing information provided by the eUSB2 device 105 control messages in order to manage bus state transitions by the USB2 device 120 and thus broker communications between the eUSB2 device 105 and the USB2 device 120.

Upon a suspend or reset of a USB2 device by a USB2 host system, a conventional host repeater initiates reset or suspend and changes state immediately, resulting in the detection of the extended high-speed idle by the peripheral device. Regardless if the repeater is configured as a host or peripheral repeater, the eUSB2 repeater relies on an associated eUSB2 device to provide an indication of reset and suspend bus state changes via control messages.

Since timing and/or internal information necessary for managing USB2 bus state transitions is derived by the conventional eUSB2 repeater 110 from the input signals provided by the eUSB2 device 105 via control messages, the conventional eUSB2 repeater 110 does not include an accurate clock. Consequently, the conventional eUSB2 repeater 110 is dependent on the timing information and/or internal state provided by a eUSB2 device 105. Without the timing information and/or internal state provided by the eUSB2 device, the conventional eUSB2 repeater 110 is unable to distinguish between reset and suspend bus state changes by the USB2 device 120 operating at high speed and, since the conventional eUSB2 repeater 110 expects two pulses for an EOP signal from eUSB2, is unable to translate full-speed and low-speed eUSB2 EOP signals from USB2 to eUSB2 and back to USB2.

The conventional eUSB2 repeater 110 could be modified to include an accurate clock in order to offset the missing internal state information or replicate the timing capabilities provided by the eUSB2 device 105. More specifically, the conventional eUSB2 repeater 110 could utilize this accurate clock to provide timing information used to generate USB2 EOP output sequences and to detect extended idle states on the USB2 DP/DM data lines 125 within the timing parameters defined by the USB 2.0 standard. Modifying a conventional eUSB2 repeater to include the clock hardware necessary to function without the timing information provided by the eUSB2 packet encodings and control messages provided by an eUSB2 device would result in significantly increasing the cost and complexity of the conventional eUSB2 repeater.

The reliance on timing information provided by an eUSB2 device precludes the ability of a conventional eUSB2 repeater to connect to another conventional eUSB2 repeater via its eD+/eD− eUSB2 port. Since conventional eUSB2 repeaters lack the clock hardware necessary to detect extended idle states and expect full-speed and low-speed eUSB2 EOP signals to be encoded using two timed pulses, two conventional eUSB2 repeaters are unable to support full USB communications between them.

FIG. 2 depicts a conventional USB system that implements electrical isolation between an eUSB2 device 205 and a USB2 device 220 using a conventional eUSB2 repeater 245. In the conventional system of FIG. 2, isolation is provided via an optical interface. The conventional eUSB2 repeater 245 provides isolated communications between a eUSB2 device 205 and a USB2 device 220. The eUSB2 repeater 245 is comprised within integrated component 235 along with optical transceiver 240, which transmits digital eUSB2 data in optical transmissions to optical transceiver 210. As described above, the conventional eUSB2 repeater 245 is reliant on timing information provided by an eUSB2 device and is thus limited to isolating an eUSB2 device 205 from a USB2 device 220. Consequently, the conventional eUSB2 repeater 245 is not capable of supporting isolated communications between two USB2 devices.

FIG. 3 illustrates a system implementing electrical isolation utilizing two isolating eUSB2 repeaters 345 and 360 according to various embodiments. The isolating eUSB2 repeaters 345 and 360 are configured such that they are capable of communicating with other eUSB2 repeaters or other similar eUSB2 components that similarly do not include the clock hardware necessary to provide timing information. The isolating eUSB2 repeaters 345 and 360 are able to support translating full-speed and low speed EOP signals from eUSB2 to USB2 and are able to detect extended idle states indicating transitions from USB2 high speed communications to reset or suspend bus states. The isolating eUSB2 repeaters 345 and 360 support these capabilities without relying on eUSB2 timed-pulse EOP signals or eUSB2 control messages. In addition, isolating eUSB2 repeaters 345 and 360 support these capabilities without the use of an accurate clock.

Certain isolating eUSB2 repeater embodiments may utilize non-crystal oscillators, such as a ring oscillator, for use in implementing certain timing functions. However, such inaccurate clocks are not suitable for generating timed-pulse signals or use to accurately detect and signal USB2 bus state changes in the manner defined by eUSB2 standard. Consequently, the eUSB2 repeaters 345 and 360 are configured to utilize alternative mechanisms for transmitting packets without timed-pulse EOP encodings and managing bus state changes without relying on eUSB2 control messages.

In the illustrated embodiment, a standard USB2 device 305 is connected to another standard USB2 device 320. Both USB2 devices 305 and 320 communicate conventionally using analog DP/DM data signal lines 315 and 325, respectively. Electrical isolation is provided in the illustrated embodiment by the isolating eUSB2 repeaters 345 and 360 that are configured to transmit the data communicated between the USB2 devices 320 and 305 across an isolation barrier 330. The eUSB2 repeaters 345 and 360 are configured to communicate using a modified eUSB2 protocol that is transmitted across the isolation barrier 300 by optical transceivers 310 and 340.

In the embodiment of FIG. 3, the isolating eUSB2 repeaters 345 and 360 electrically isolate the USB2 devices 320 and 305, via an optical communication connection 330 supported by optical transceivers 310 and 340. The optical transceivers 310 and 340 are used to transmit digital signal data between the isolating eUSB2 repeaters 345 and 360. For bus state changes from USB2 high-speed communications, the transmitted digital signal data represents the detected USB2 bus state communicated using the eUSB2 protocol modified as described. Communications between USB2 device 305 and its associated isolating eUSB2 repeater 360 and communications between USB2 device 320 and its associated isolating eUSB2 repeater 345 utilize the conventional eUSB2 encodings defined for USB2 to eUSB2 communications.

In the illustrated embodiment, optical transceiver 340 is part of an integrated component 335 along with the isolating eUSB2 repeater 345, with the integrated component 335 physically located with the USB2 device 320. Optical transceiver 310 and isolating eUSB2 repeater 360 form another integrated component 355 that is physically located with the USB2 device 305. In other embodiments, an integrated component consisting of both isolating eUSB2 repeaters and optical transceivers may be physically located with only one of the USB2 devices 320 or 305. Certain embodiment may not utilize integrated components and may consist of individual isolating eUSB2 repeater and transceiver components.

The isolating eUSB2 repeater 345 communicates conventionally with the USB2 device 320 using analog DP/DM data signal lines 325. The isolating eUSB2 repeater 345 converts between the analog DP/DM data utilized by the USB2 device 320 and the low-voltage, eD+/eD− digital data that is used to communicate with the isolating eUSB2 repeater 360 on the other side of the isolation barrier 330. The isolating eUSB2 repeater 345 is connected to optical transceiver 340 via at least one pair of signal lines 350, each pair consisting of dedicated transmission and reception lines. The isolating eUSB2 repeater 345 communicates low-voltage digital eUSB2 data to the optical transceiver 340 via these pairs of signal lines 350. The optical transceiver 340 converts the digital eUSB2 data to optical data which is then transmitted via optical transmission 330 to optical transceiver 310, located at the USB2 device 305.

The optical transceiver 310 receives the optical data and converts it to the low-voltage digital signal eUSB2 data, which is then provided to the isolating eUSB2 repeater 360. The isolating eUSB2 repeater 360 converts the low-voltage eUSB2 digital signal data to USB2 DP/DM signals. Since isolating eUSB2 repeater 345 does not include an accurate clock needed to generate such signals, the eUSB2 digital signal data received by the isolating eUSB2 repeater 360, does not include timed-pulses used for full-speed and low-speed EOP signals. Furthermore, the eUSB2 digital signal data received by the isolating eUSB2 repeater 345 may not include eUSB2 control messages that indicate high-speed bus state changes. If control messages indicating an extended idle state are provided by isolating eUSB2 repeater 345, the timing of any such control messages is not guaranteed to be within the parameters specified by the eUSB2 standard. Accordingly, the isolating eUBS2 repeaters 345 and 360 are configured according to various embodiments to utilize alternative mechanisms for translating EOP signals and for managing bus state changes without relying on accurately-timed control messages or without relying on control messages altogether.

Unlike the conventional repeater 110 described with respect to FIG. 1, the isolating eUSB2 repeaters 345 and 360 are able to support translation of EOP signals for full-speed and low-speed USB connections without the timing information provided via the pair of timed pulses used to encode an eUSB2 EOP signal. Instead, the isolating eUSB2 repeaters 345 and 360 are configured to generate USB2 EOP signals using non-compliant eUSB2 signaling that utilizes approximated timing information.

High-speed EOP signals are identical in the eUSB2 and USB2 specifications. Consequently, in the scenario where commands are flowing from the USB2 device 320 to the USB2 device 305, the isolating eUSB2 repeater 345 forwards high-speed EOP signals from the USB2 device 320 to the USB2 device 305 without retiming or decoding the transmission, thus acting as a redriver component for high-speed EOP signals. In certain embodiments, the isolating eUSB2 repeaters 345 and 360 serve as redrivers for all high-speed communications since there are minimal differences in high-speed signaling in the eUSB2 and USB2 protocols. Thus, during a high-speed communication session, the isolating eUSB2 repeaters 345 and 360 according to certain embodiments may function as redrivers that forward all received eUSB2 and USB2 data without attempting to decode or retime the data.

In order to support eUSB2 full-speed and low-speed communications across the optical isolation barrier 330, the isolating eUSB2 repeaters 345 and 360 are configured to utilize the eUSB2 EOP encoding that is utilized conventionally in the USB2 to eUSB2 direction. Thus, in response to a USB2 EOP signal from USB2 device 305, the isolating eUSB2 repeater 360 transmits a single pulse while the SE0 component of the EOP signal is received from the USB2 device 305. The single pulse is relayed across the isolation barrier 330 by the optical transceivers 310 and 340. Upon receipt of the single pulse, the isolating eUSB2 repeater 345 is configured to generate a corresponding USB2 EOP signal that is transmitted to the USB2 device 320. The isolating eUSB2 repeater 345 generates the USB2 EOP signal in the DP/DM connection 325 by driving an SE0 state while receiving the single pulse and driving a J state for an approximation of one unit interval, where the length of the approximated unit interval is generated without the use of an accurate clock signal. As described, certain isolating eUSB2 repeater embodiments will use components such as ring oscillators to approximate the length of a unit interval.

Another aspect of conventional eUSB2 repeaters that relies on timing or local state information provided by an eUSB2 device is the determination of bus state transitions from high-speed by a USB2 device. As described, conventional eUSB2 repeaters do not include accurate clock hardware necessary to detect extended idle states that trigger changing terminations and determining whether the extended idle is associated with a reset or suspend state. Consequently, a conventional eUSB2 repeater relies on the control messages sent by a eUSB2 device for exiting a high-speed (L0) state and reverting to full-speed terminations for suspend (L2), whether the repeater is a host or peripheral repeater and reverting to full-speed terminations for a USB2 reset if the repeater is a peripheral repeater and its USB2 port connects to the host.

Addressing these issues, isolating eUSB2 repeaters according to various embodiments are configured to detect when a USB2 device is being reset or suspended from a high-speed state or disconnected while suspending from a high-speed state. Certain of the steps of this detection process are described below with reference to FIG. 5. With reference to FIG. 3, isolating eUSB2 repeater 360 begins this detection process upon a determining an extended, high-speed idle state 505 in the connection 315 to USB2 device 305 or upon receiving a bus state message from isolating eUSB2 repeater 345 upon expiration of an idle timer. In certain embodiments, the eUSB2 repeater 360 utilizes a non-crystal timing mechanism such as a ring-oscillator to detect an extended idle condition in the connection to USB2 device 305.

Upon detecting an extended, high-speed idle state, the isolating eUSB2 repeater 360, enables a pullup, disables its high-speed termination 510 and monitors for a full-speed J state signal 515. If the full-speed J state is detected 520, an L2/Suspend of the USB2 device 305 is indicated 525. Both the isolating eUSB2 repeaters 345 and 360 also monitor for a chirp K signal 530 from the USB2 device 305, which would indicate 535 a response to a USB2 reset. In this manner, the eUSB2 repeaters 345 and 360 determine whether an idle state corresponds to a USB2 reset or L2/suspend of the USB2 device 305.

Based on this determination of an L2/suspend or reset entry by of the USB2 device 305, the isolating eUSB2 repeaters 345 and 360 can communicate bus state messages over the isolation barrier and update their internal states accordingly. In certain embodiments, isolating eUSB2 repeaters 345 and 360 are configured identically and both are able to determine a suspend or reset of an upstream USB2 device and a suspend or disconnect of a downstream USB2 device 320. In certain other embodiments, isolating eUSB2 repeaters 345 and 360 are not configured identically such that only one of the isolating eUSB2 repeaters is configured to detect an extended high-speed idle and/or to monitor for bus state signals from which the bus state can be derived. Other embodiments, may utilize additional or different techniques for detecting a suspend, reset or disconnect status of the connection 315 or 325 of a USB2 device without relying fully on eUSB2-compliant control messages.

Another eUSB2 control message that is not available without an eUSB2 device such as 105 or 205 is an L1 control message indicating a USB2 device is entering a sleep state. This L1 control message is issued by when operating in high-speed in order to revert to full-speed termination. Conventional eUSB2 repeaters rely on eUSB2 devices to detect L1 state transitions based on the exchange of packets that may require an accurate clock and a clock and data recovery circuit for decoding and subsequent issuance of L1 control messages. An isolating eUSB2 repeater is configured to detect L1 state transitions without the L1 control message and without an accurate clock or a data recovery circuit.

Isolating eUSB2 repeaters according to various embodiments are configured to monitor for an alternative indication a transition from high-speed to an L1 sleep state. With reference to FIG. 3, the isolating eUSB2 repeater 345 monitors the DP/DM signal pathway 325 for a sequence of two Token packets from the USB2 host/hub-downstream port device 320 and monitors for a single Handshake packet from the USB2 peripheral/hub-upstream port device 305. The isolating eUSB2 repeater 345 identifies the Token and Handshake packets based on their lengths and inter-packet gaps. Upon detecting the sequence of two Token packets followed by a single Handshake packet, the isolating eUSB2 repeater 345 is further configured to monitor for high-speed communication within 10 μs of the identified sequence. If no such high-speed communications are identified, the L1 state is confirmed and is communicated to USB2 device 320.

In certain embodiments, isolating eUSB2 repeaters 345 and 360 are configured identically and either or both monitor for the described packet sequence indicating an L1 bus state entry. In certain other embodiments, only one of the isolating eUSB2 repeats is configured to monitor for L1 state transitions and bus state determinations are transmitted between the isolating eUSB2 repeater using bus state messages.

Another set of eUSB2 control messages that are not available to an eUSB2 repeater without an eUSB2 device such as 105 or 205 are Host and Peripheral control messages. Conventional eUSB2 repeaters are configured as either a host repeater or a peripheral repeater based on control messages received from a eUSB2 device. In order to configure the role of the isolating eUSB2 repeaters comprising an isolation system according to certain embodiments, both isolating eUSB2 repeaters 345 and 360 are configured to default to host mode. Both isolating eUSB2 repeaters 345 and 360 monitor for a pullup from their associated USB2 device. The isolating eUSB2 repeater that detects a pullup from their associated USB2 device is configured as the host repeater. The other isolating eUSB2 repeater not detecting a pullup is configured as a peripheral repeater.

In certain embodiments, peripheral repeater configuration results from signaling between the two isolating eUSB2 repeaters. In certain other embodiments, the isolating eUSB2 repeaters have fixed roles as host or peripheral repeaters, where one repeater is always a host repeater and the other is always peripheral repeater.

FIG. 4 illustrates the use of isolating eUSB2 repeaters according to various embodiments configured to provide high-speed isolation for two USB2 devices, 405 and 450, utilizing a configurable isolation barrier capable of supporting eUSB2 digital signaling used by isolating eUSB2 repeaters 420 and 440. Isolating eUSB2 repeater 420 communicates with USB2 device 405 via conventional DP/DM analog signaling 410. Isolating eUSB2 repeater 440 likewise communicates with USB2 device 450 via conventional DP/DM analog signaling 445.

In certain embodiments, digital isolator 430 includes the optical transceivers described with respect to FIG. 2 and an optical fiber supporting high-speed, electrically isolating optical transmissions between the transceivers. In other embodiments, digital isolator 430 will utilize different isolating transmission mediums instead of optical communications. For instance, certain embodiments may utilize line-of-sight communications in place of the optical fiber. Other embodiments may utilize inductive or capacitive communication interfaces that are capable of supporting digital communications. Other embodiments may utilize radio frequency transmissions to implement the digital isolation barrier. Certain embodiments may allow the digital isolator 430 to be configured such that different isolating mediums can be selected for use by the digital isolator.

In embodiment of FIG. 3, the optical communications are supported by optical transceivers 310 and 340 that communicate via optical transmissions 330 over a mechanisms such as a fiber optic link. Embodiments utilizing other types of isolation barriers will utilize transceivers configured to provide digital communications across the type of isolation barrier utilized by the embodiment. In the illustrated embodiment, the two isolating eUSB2 repeaters 420 and 440 are incorporated in an integrated component 415 along with the digital isolation barrier 430. Other embodiments may not utilize an integrated component or may use alternative components groupings.

Due to the described capabilities of an isolating eUSB2 repeater according to various embodiments, an isolation barrier can be provided that supports high-speed USB communications. By utilizing the digital signaling infrastructure provided by eUSB2 that is adapted as described, high-speed communications can be provided by an isolating eUSB2 repeater in a manner that does not utilize an accurate clock nor does it rely on receipt of eUSB2 compliant control messages. Instead, an isolating eUSB2 repeater according to embodiments may utilize a non-crystal oscillator, such as a ring oscillator, to implement timing functions. An additional simplification resulting from the method described to detect L1 entry from high-speed is the lack of a serializer/deserializer component. Present in conventional eUSB2 devices, a serializer/deserializer would add significant complexity to the isolating repeater. Due to these simplifications, an isolating eUSB2 repeater according to embodiments can be provided at lower cost and complexity compared to other possible isolating repeater implementations.

Many modifications and other embodiments will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A system for providing electrically isolated communications, the system comprising:
a first digital transceiver operable to communicate with a second digital transceiver, wherein the digital transceiver communications are digital signals, and wherein the digital transceiver communications are conducted via an electrically isolating communication interface;
the second digital transceiver;
a first isolating embedded Universal Serial Bus 2.0 (eUSB2) repeater coupled to the first digital transceiver and further coupled to a first USB2 device, the first isolating eUSB2 repeater operable to translate between USB2 communications with the first USB2 device and the digital signals and further operable to communicate the digital signals to the first digital transceiver; and
a second isolating eUSB2 repeater coupled to the second digital transceiver and further coupled to a second USB2 device, the second isolating eUSB2 repeater operable to translate between USB2 communications with the second USB2 device and the digital signals and further operable to communicate the digital signals to the second digital transceiver;
wherein the first isolating eUSB2 repeater is operable to detect an extended high-speed idle state in the first USB2 device and further operable to derive bus state of the first USB2 device based on a detection of J state and chirp K signals by the first USB2 device, wherein the J state is a signaling state.

2. A system for providing electrically isolated communications, the system comprising:
a first digital transceiver operable to communicate with a second digital transceiver, wherein the digital transceiver communications are digital signals, and wherein the digital transceiver communications are conducted via an electrically isolating communication interface;

the second digital transceiver;
a first isolating embedded Universal Serial Bus 2.0 (eUSB2) repeater coupled to the first digital transceiver and further coupled to a first USB2 device, the first isolating eUSB2 repeater operable to translate between USB2 communications with the first USB2 device and the digital signals and further operable to communicate the digital signals to the first digital transceiver; and
a second isolating eUSB2 repeater coupled to the second digital transceiver and further coupled to a second USB2 device, the second isolating eUSB2 repeater operable to translate between USB2 communications with the second USB2 device and the digital signals and further operable to communicate the digital signals to the second digital transceiver;
wherein the first isolating eUSB2 repeater is operable to detect sleep state in the first USB2 device based on detection of handshake and token packets transmitted by the first USB2 device and the second USB2 device.

3. A method for providing electrically isolated communications, the method comprising:
receiving, at a first isolating embedded Universal Serial Bus 2.0 (eUSB2) repeater, analog differential pair USB2 communications from a first USB2 device;
translating, by the first isolating eUSB2 repeater, between the USB2 communications and digital signals;
communicating the digital signals to a second isolating eUSB2 repeater via an electrically isolating communication interface;
receiving the digital signals at the second isolating eUSB2 repeater;
translating, by the second isolating eUSB2 repeater, between the digital signals and USB2 communications for delivery to a second USB2 device;
wherein the first isolating eUSB2 repeater is operable to detect an extended high-speed idle state in the first USB2 device and further operable to derive bus state of the first USB2 device based on a detection of J state and chirp K signals by the first USB2 device, wherein the J state is a signaling state.

4. A method for providing electrically isolated communications, the method comprising:
receiving, at a first isolating embedded Universal Serial Bus 2.0 (eUSB2) repeater, analog differential pair USB2 communications from a first USB2 device;
translating, by the first isolating eUSB2 repeater, between the USB2 communications and digital signals;
communicating the digital signals to a second isolating eUSB2 repeater via an electrically isolating communication interface;
receiving the digital signals at the second isolating eUSB2 repeater;
translating, by the second isolating eUSB2 repeater, between the digital signals and USB2 communications for delivery to a second USB2 device;
wherein the first isolating eUSB2 repeater is operable to detect sleep state in the first USB2 device based on detection of handshake and token packets transmitted by the first USB2 device and the second USB2 device.

5. An isolating embedded Universal Serial Bus 2.0 (eUSB2) repeater for providing electrically isolated communications between a first USB2 device and a second USB2 device, the repeater comprising:
an eUSB2 port coupled to a digital transceiver, the eUSB2 port configured to communicate digital signals via an electrically isolating communication interface with a first isolating eUSB2 repeater configured to communicate the digital signals to the second USB2 device;
a USB2 port coupled to a first USB2 device, the USB2 port configured to receive analog differential pair USB2 communications from the first USB2 device;
a processor;
a memory coupled to the processor, the memory storing computer-readable instructions that, upon execution by the processor, cause the repeater to:
translate between the USB2 communications received from the first USB2 device and the digital signals, wherein the translation utilizes a non-crystal oscillator;
communicate the translated digital signals to the second USB2 device via the eUSB2 port and the translated USB2 communications to the first USB2 device via the USB2 port;
wherein the translation of USB2 communications comprises translating an end-of-packet signal received from the first USB2 device to a single digital pulse;
wherein the translation of USB2 communications further comprises translating the single digital pulse received from the second USB2 device to an USB2 end-of-packet signal by driving an single-ended zero (SE0) state for the duration of the single digital pulse and by driving a J state for an unit interval approximated using the non-crystal oscillator, wherein the J state is a signaling state.

6. An isolating embedded Universal Serial Bus 2.0 (eUSB2) repeater for providing electrically isolated communications between a first USB2 device and a second USB2 device, the repeater comprising:
an eUSB2 port coupled to a digital transceiver, the eUSB2 port configured to communicate digital signals via an electrically isolating communication interface with a first isolating eUSB2 repeater configured to communicate the digital signals to the second USB2 device;
a USB2 port coupled to a first USB2 device, the USB2 port configured to receive analog differential pair USB2 communications from the first USB2 device;
a processor;
a memory coupled to the processor, the memory storing computer-readable instructions that, upon execution by the processor, cause the repeater to:
translate between the USB2 communications received from the first USB2 device and the digital signals, wherein the translation utilizes a non-crystal oscillator;
communicate the translated digital signals to the second USB2 device via the eUSB2 port and the translated USB2 communications to the first USB2 device via the USB2 port;
the memory storing additional computer-readable instructions that, upon execution by the processor, cause the repeater to:
detect an extended high-speed idle state in the first USB2 device; and
derive bus state of the first USB2 device based on a detection of J state and chirp K signals by the USB2 device, wherein the J state is a signaling state.

7. An isolating embedded Universal Serial Bus 2.0 (eUSB2) repeater for providing electrically isolated communications between a first USB2 device and a second USB2 device, the repeater comprising:
an eUSB2 port coupled to a digital transceiver, the eUSB2 port configured to communicate digital signals via an electrically isolating communication interface with a first isolating eUSB2 repeater configured to communicate the digital signals to the second USB2 device;

a USB2 port coupled to a first USB2 device, the USB2 port configured to receive analog differential pair USB2 communications from the first USB2 device;
a processor;
a memory coupled to the processor, the memory storing computer-readable instructions that, upon execution by the processor, cause the repeater to:
translate between the USB2 communications received from the first USB2 device and the digital signals, wherein the translation utilizes a non-crystal oscillator;
communicate the translated digital signals to the second USB2 device via the eUSB2 port and the translated USB2 communications to the first USB2 device via the USB2 port;
the memory storing additional computer-readable instructions that, upon execution by the processor, cause the repeater to:
detect a sleep state in the first USB2 device based on detection of handshake and token packets transmitted by the first USB2 device and the second USB2 device.

* * * * *